(12) United States Patent
Kaldvee

(10) Patent No.: US 10,410,102 B2
(45) Date of Patent: Sep. 10, 2019

(54) DIRECT PART MARKING

(71) Applicant: ROLLS-ROYCE plc, London (GB)

(72) Inventor: Andres Kaldvee, Derby (GB)

(73) Assignee: Rolls-Royce plc (GB)

( * ) Notice: Subject to any disclaimer, the term of this patent is extended or adjusted under 35 U.S.C. 154(b) by 0 days.

(21) Appl. No.: 15/934,151

(22) Filed: Mar. 23, 2018

(65) Prior Publication Data

US 2018/0276514 A1     Sep. 27, 2018

(30) Foreign Application Priority Data

Mar. 24, 2017  (GB) .................................. 1704658.2

(51) Int. Cl.
| | | |
|---|---|---|
| *G06K 21/00* | (2006.01) | |
| *G06K 19/06* | (2006.01) | |
| *B42D 25/00* | (2014.01) | |
| *B29C 64/153* | (2017.01) | |
| *G06K 9/32* | (2006.01) | |
| *G06K 19/08* | (2006.01) | |
| *G06T 7/00* | (2017.01) | |
| *B33Y 10/00* | (2015.01) | |
| *B33Y 80/00* | (2015.01) | |

(52) U.S. Cl.
CPC ...... *G06K 19/06037* (2013.01); *B29C 64/153* (2017.08); *B42D 25/00* (2014.10); *G06K 9/3208* (2013.01); *G06K 19/086* (2013.01); *G06T 7/0008* (2013.01); *B33Y 10/00* (2014.12); *B33Y 80/00* (2014.12); *G06T 2207/30164* (2013.01); *G06T 2207/30204* (2013.01)

(58) Field of Classification Search
CPC ....... B29C 64/153; B33Y 10/00; B33Y 80/00; B42D 25/00; G06K 19/06037; G06K 19/086; G06K 9/3208; G06T 2207/30164; G06T 2207/30204; G06T 7/0008
See application file for complete search history.

(56) References Cited

U.S. PATENT DOCUMENTS

| | | | |
|---|---|---|---|
| 2004/0034214 A1* | 2/2004 | Nightingale | G06K 19/06046 536/56 |
| 2006/0053303 A1* | 3/2006 | Borrieres | A61B 5/117 713/185 |
| 2010/0155494 A1* | 6/2010 | Quine | G06K 1/121 235/494 |
| 2012/0183701 A1 | 7/2012 | Pilz et al. | |

(Continued)

FOREIGN PATENT DOCUMENTS

| | | |
|---|---|---|
| CN | 103729767 | 4/2014 |
| CN | 203909839 | 10/2014 |

(Continued)

OTHER PUBLICATIONS

Extended EP Search Report completed on May 22, 2018 and issued in connection with EP Appln. No. 18159925.9.

(Continued)

*Primary Examiner* — Thien M Le

(74) *Attorney, Agent, or Firm* — Barnes & Thornburg LLP

(57) ABSTRACT

A method of manufacturing a component comprising forming an identifier internally within the component in a predetermined manner, wherein the identifier can be used to subsequently identify or authenticate the component.

20 Claims, 2 Drawing Sheets

(56) References Cited

U.S. PATENT DOCUMENTS

| | | | | |
|---|---|---|---|---|
| 2014/0326784 A1* | 11/2014 | Naik | ................... | G06Q 10/08 |
| | | | | 235/375 |
| 2015/0180989 A1* | 6/2015 | Seth | ................ | G06Q 30/0276 |
| | | | | 709/224 |
| 2016/0071258 A1* | 3/2016 | McClung, III | ....... | G06K 9/6267 |
| | | | | 705/4 |
| 2017/0018074 A1* | 1/2017 | Karlen | .................. | G06K 9/18 |
| 2018/0140272 A1* | 5/2018 | Ruchala | ................ | A61B 6/583 |

FOREIGN PATENT DOCUMENTS

| | | |
|---|---|---|
| EP | 2332738 A1 | 6/2011 |
| EP | 3053741 | 8/2016 |
| JP | 2004259004 | 9/2004 |

OTHER PUBLICATIONS

Great Britain Search Report dated Sep. 20, 2017 issued in GB Patent Application No. 1704658.2.

* cited by examiner

DIRECT PART MARKING

CROSS-REFERENCE TO RELATED APPLICATIONS

This disclosure claims the benefit of UK Patent Application No. GB 1704658.2, filed on 24 Mar. 2017, which is hereby incorporated herein in its entirety.

BACKGROUND

Field of Invention

The present disclosure concerns marking components for later identification or authentication.

Description of Related Art

It is known to directly mark the surface of a manufactured component to enable the component to be identified or the authenticity of the component to be verified at a later date. Markings are typically stamped or etched into a surface of the component and may only be removed or destroyed by severe wear or erosion at the site of the marking. To avoid surface markings wearing off, they are often made at locations where surface erosion is at a minimum on a component.

A problem with direct surface markings is that they can be readily viewed by anyone in possession of the component, meaning anyone wishing to make a counterfeit component can replicate the marking on an authentic component with relative ease and thereby make counterfeit components difficult to distinguish from authentic components.

It is therefore desirable for improvements in the field of marking components.

BRIEF SUMMARY

According to a first aspect there is provided a method of manufacturing a component comprising forming an identifier internally within the component in a predetermined manner, wherein the identifier can be used to subsequently identify or authenticate the component.

The identifier may comprise one or more identifying features. The identifier or identifying features may be arranged in predetermined locations or in a predetermined pattern internally within the component. The identifier or identifying features may also be known as a marking or part marking. The identifier or identifying features may be arranged in a dot matrix or as a QR code.

The identifier or the identifying features may comprise one or more voids. The voids may be at vacuum, or may be filled with a liquid or gas.

The identifier or the identifying features may comprise one or more volumes of material.

The component may comprise a first material. The volumes of material may comprise a second material different to the first material or having different physical properties to the first material. The second material may have different electromagnetic properties to the first material. The second material may be distinguishable from the material or materials of the rest of the component using measurement techniques, such as CT scanning or ultrasound. The volumes of the second material may be embedded within the first material.

The identifier may not form part of the outer surface of the component.

The identifier may not be detectable by visual inspection of the component. The identifier may be a covert identifier. The identifier may be embedded within the component such that the identifier is occluded from visual identification or inspection.

The identifier may comprise non-structural features. Non-structural may be understood as the identifier has no other function than to enable identification or authentication of the component. The identifier may not materially affect the physical properties of the component, for example by being physically small or by being formed from physically similar but detectably distinct material to the rest of the component.

The identifier may comprise one or more elongate features which extend internally within the component. The elongate features may be the identifying features of the identifier. The identifier may comprise two or more elongate features which may extend along parallel axes with respect to each other. Cutting the component along a plane other than a plane substantially perpendicular to the parallel axes may destroy the identifier. Destroying the identifier may comprise making the identifier unidentifiable at a cutting location. The identifier or identifying features thereof may be located to intersect a predetermined plane passing through the component or a predetermined slice of a component formed between two planes, which may be notional planes. The plane or planes may be oblique to a main axis of the component. The predetermined plane may be positioned with respect to a datum point or a datum surface, and these datums could be used to define the alignment of the predetermined plane. Cutting the component along a cutting plane other than the predetermined plane may destroy the identifier. The cutting plane may be any plane which is parallel to the predetermined plane or slice.

The location of the identifier within the component may be recorded and stored in a database.

Manufacturing the component may further comprise additive manufacturing.

The identifier may be used to authenticate a characteristic, origin, or manufacturer of the component.

The identifier may be a unique identifier which can be used to distinguish the component from one or more substantially identically shaped components. A serial number of the component may be encoded into the identifier.

The identifier may be a group identifier common to a group of components which comprises the manufactured component. The group of components may be a group of components manufactured in a specific batch. A plurality of components may be manufactured according to the method described herein to form a group of components. The identifier of each of the plurality of components may be the group identifier.

The method may further comprise manufacturing a second component, wherein a second identifier formed internally within the second component is different to the first identifier within the first component such that the identifiers of the first and second components can be used to distinguish between the first and second components.

The method may further comprise manufacturing a second component, wherein a second identifier formed internally within the second component is identical to the first identifier within the first component, such that the first and second identifiers can be used to verify that the first and second components share a common characteristic or are both members of a common group of components. According to a second aspect, there is provided a component manufactured in accordance with, or having any of the features of a component manufactured in accordance with, any of the methods of the first aspect of the invention. The component may comprise an identifier formed internally within the component in a predetermined manner, wherein the identifier can be used to subsequently identify or authenticate the component.

A group of components may be provided comprising a plurality of components according to the second aspect of the invention. The identifier of each one of the group of components may be different or unique, or the identifier of each of the group of components may be identical. The identifier of each one of the group of components may comprise both unique and identical portions.

The component configured to be cut along an inspection plane such that the identifier remains intact. The component may be configured such that cutting the component through at least some planes, or all planes, other than the inspection plane prevents inspection of the identifier.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
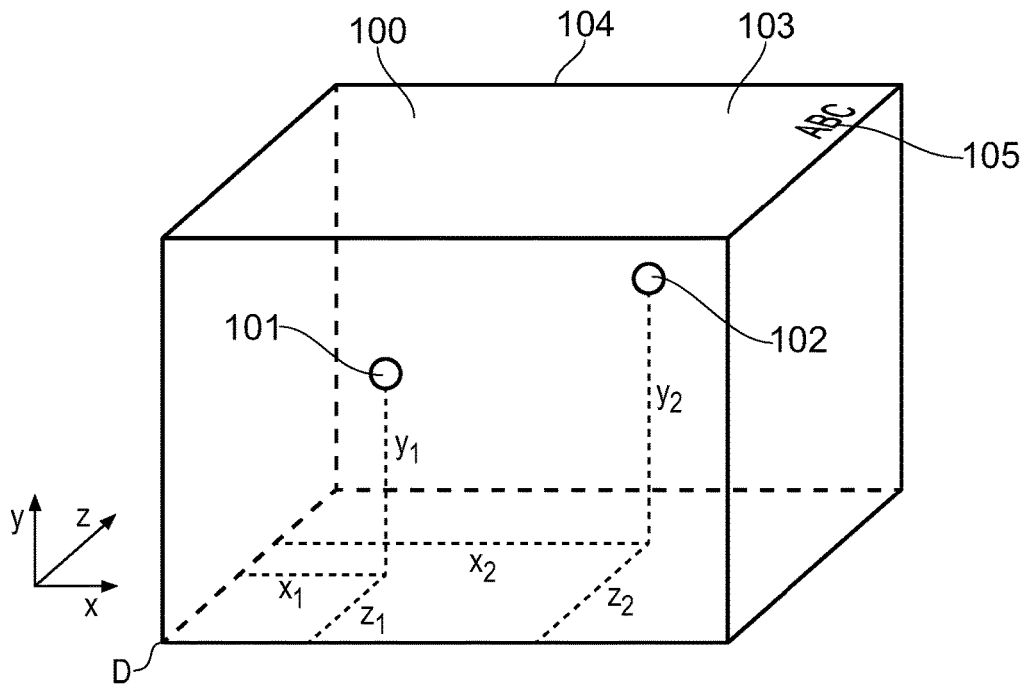
FIG. 1 shows a first embodiment of an identifier according to the present invention.

FIG. 1 shows a component 100 which is shown as being transparent to aid understanding of the invention. For simplicity, the component 100 is a cuboid. It should also be understood that the component 100 may take other more complex shapes.

The component 100 comprises an external surface 103 which, in this case, comprises six rectangular outward faces. It should be understood that the component 100, if not shown as being transparent, would appear to be a solid cuboid and the internal features would not be visible through the external surface 103. However, as mentioned, the material of the component 100 is shown as transparent to aid understanding of the invention. The external surface 103 of the component 100 comprises twelve edges 104 formed between its rectangular sides. To further aid understanding, those edges 104 which would, in reality, not be visible in the viewpoint of FIG. 1 are shown in thick dashed lines, while those that would be visible are shown in thick solid lines. A conventional surface marking 105 may be made on the external surface 103 of the component 100.

The component 100 defines an internal volume beneath its exterior surface 103. As the component 100 of FIG. 1 is substantially solid and takes the same of the cuboid, the total internal volume can be calculated by multiplying the height, depth, and width of the cuboid together.

Formed internally within the internal volume of the component is an identifier. The identifier is formed in a predetermined manner within the component 100 and comprises two identifying features 101, 102. The identifying features 101, 102 are distinguishable from the rest of the component 100 by having properties different to the rest of component 100. In FIG. 1, the identifying features have a relatively large size compared to the component 100. The identifying features 101, 102 may be substantially smaller than shown in FIG. 1. In some examples, the identifying features 101, 102 may be of sufficiently small volume that they do not materially or substantially affect the physical properties of the component 100 when compared to an equivalent component not including the identifying features.

The identifying features 101, 102 are spherical in shape in the embodiment of FIG. 1. It should be understood that the features 101, 102 may take other shapes, such as ovoid, cuboid, or any other three-dimensional shape.

The identifier of the component 100 in FIG. 1 comprises only two features 101, 102. In other examples, the identifier may consist of only one feature of the type of 101, 102 or the identifier may alternatively may consist of more than two features of the same type as features 101, 102.

The identifier of the component 100 is formed during the manufacture of the component. In some examples, the component 100 may be manufactured by additive manufacturing, which may also be known as three-dimensional printing. In such cases, the locations or coordinates of the identifier or identifying features 101, 102 may form part of the model from which the component 100 is built.

The predetermined manner in which the identifier is formed comprises the identifying features 101, 102 being formed in predetermined locations within the component 100 and in the identifying features 101, 102 each having predetermined sizes or volumes. The predetermined locations of each of the identifying features 101, 102 can be defined as follows.

Identifying feature 101 is formed at predefined three-dimensional Cartesian coordinates x1, y1, and z1 relative to a datum point D. In FIG. 1, the datum point D is formed at a corner vertex of the component 100. The predefined coordinates x1, y1, z1, are measured along three axes x, y, z measured from the datum point D. Axis x extends parallel to a width of the component 100, axis y extends parallel to a height of the component 100, and axis z extends parallel to a depth of the component 100.

Thus, the identifying feature 101 is formed at a distance x1 measured along axis x from datum point D, a distance y1 along axis y from the datum point D, and a distance z1 along axis z from the datum point D. Before manufacture of the component 100, the coordinates of each identifying feature 101, 102 are predetermined and the identifying features are placed at their predetermined coordinates within the component during the manufacturing process. Identifying feature 102 is located at its predetermined coordinates x2, y2, and z2 in the same manner as for identifying feature 101.

The predetermined coordinates for each identifying feature of the identifier may be recorded in a database for later comparison with measured identifier locations for verification, identification, or authentication purposes.

In other examples, components will have more complex geometries than that of component 100. In such cases, the predetermined locations or coordinates of each identifying feature may still be defined in the same manner. A datum point D and the directions of axes x, y, z can be defined, and then the locations of the identifying features can be defined within the volume of the component using this coordinate system. The datum point D may be outside of the volume of the component, or may be within the volume of the component. Of course, it should be understood that other systems for defining the location of the identifier or identifying features within a component can be used, such as cylindrical or spherical coordinates.

In the embodiment of FIG. 1, the two identifying features 101, 102 may take many different forms. It is a minimum requirement that the identifying features 101, 102 can be distinguished from the rest of the component 100 by some investigative means. In two particular examples, the identifying features 101, 102 may be voids within the component, or may be volumes of material which are distinguishable from the other material or materials from which the component is formed.

In the first example, where the identifying features are voids within the component 100, the voids may be small volumes where no solid material is present. The voids may or may not be filled with a liquid or gas. The voids may alternatively be at vacuum pressure or near-vacuum pressure.

In other examples, the identifying features may be volumes of material which is distinguishable from the other material or materials from which the component is formed. For example, the identifying features may be formed of a material having different electromagnetic properties to the material of the rest of the component. In other examples, the identifying features may be formed of a similar type of material to the rest of the component, but may be volumes of material which have been treated or manipulated to be distinguishable from the remainder of the material of the component 100, for example by being magnetized or polarized. In some examples, the identifying features may alter a centre of gravity of the component 100 or exhibit differences in heat transfer coefficient compared to the material of the remainder of the component 100 which may be detectable.

As the identifier is formed of the identifying features 101, 102 which are distinguishable from the material of rest of the component 100, measurements can be made on the component to identify the locations of the identifying features 101, 102 later. For example, there may be many hundreds or thousands of components which are ostensibly identical to the component 100. Once the component 100 has been manufactured, it may be put into use for an extended period of time. After its use in the field, it may no longer be possible to distinguish the component 100 from other components of the same type with external observation. In some cases, the user may be concerned whether a component is a genuine component, like component 100, or a counterfeit component.

Of course, because the identifier is not detectable from outside the component and the locations of the identifying features are only known to the manufacturer, or a party who is aware of the appropriate methods to later locate the identifying features, it is unlikely that a counterfeit manufacturer will be able to replicate the identifier of component 100 in a counterfeit component.

In order to authenticate whether any given component is a genuine component 100, measurements can be made to locate the identifier comprising identifying features 101, 102 within the component. If measurements are made and it is detected that the identifier is not present, or an identifier having a different form is present, then it can be concluded that the measured component is not the component 100.

The identifier can be used for either identification of individual components or authentication of components.

For identification of individual components, the locations, number, and sizes of the identifying features forming the identifier must be different for each and every component manufactured. As each identifier is unique, two seemingly identical components can be distinguished by locating their respective identifiers.

Alternatively, if it is not necessary to distinguish between individual components, and it is merely necessary to authenticate that a component is genuine, then the identifier for each of a group of components can be identical. For example, a large number of components 100 can be made having an identifier identical to that of FIG. 1. If the authenticity of a component is later called into question, then its identifier can be located and, if the identifier matches that for the group of components 100, then it can be assumed that the component is one of the authentic components 100.

In some examples, the identifier may comprise both an individual identifier to distinguish individual components and a common identifier to authenticate that the component is an authentic one of a group of components.

The identifier of the component can be detected using any means suitable for making measurements beneath the surface of an object. In some examples, a CT scanner can be used to scan the component 100 and locate the identifying features 101, 102 therein. It should be understood that other non-destructive testing methods can be used to locate the identifier, such as ultrasound.

In some examples, the identifier can be located using destructive means. If the location of the identifier for a certain type of component is known, and it is wished to verify that a component is authentic, then the component can be cut in a plane intersecting the identifier in order to verify that the component is authentic or to identify the component as counterfeit. For example, as the locations of the identifying features 101, 102 of component 100 are known, the component could be cut along a plane intersecting both of the features 101, 102 in order to verify that the component is the authentic component 100. If a component which ostensibly appears to be component 100 is cut along this same plane, and the identifying features are not present, then it can be concluded that the component is not the authentic component 100.

Of course, the component being tested will be destroyed using this method. However, the cost of destroying some authentic components may be offset by the value of identifying counterfeit components. It should also be noted that the identifiers of the present invention may be combined with other types of marking, and the destructive testing of the component to locate the identifier may be used as a last resort if testing of other markings proves inconclusive.

Figure 2:
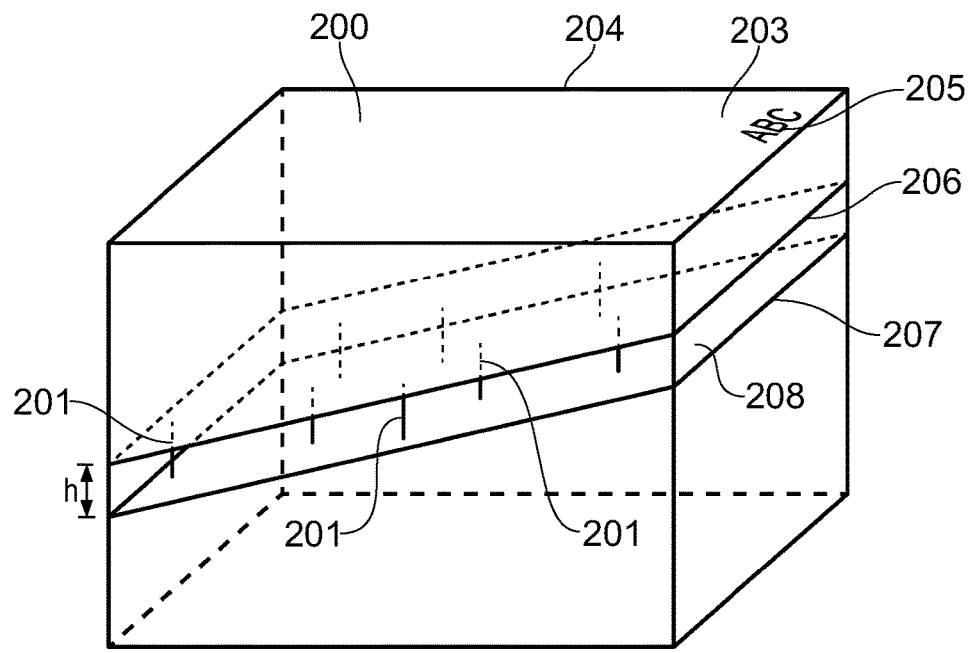
FIG. 2 shows a second embodiment of an identifier according to the present invention.

FIG. 2 shows a component 200 formed according to the method of the present invention. Like features between the component 100 and the component 200 are denoted by reference numerals differing by 100.

As with FIG. 1, the component 200 is shown transparent to aid understanding. An identifier is also formed internally within the component 200 in a predetermined manner. In this embodiment, the identifier comprises a plurality of elongate identifying features 201.

The identifying features 201 extend in parallel directions between two notional parallel planes 206, 207 which intersect the component and are spaced apart by a distance h. The volume of the component 200 between the planes 206, 207 forms a notional slice 208 of the component 200 and all of the identifying features 201 extend in parallel directions through the slice 208 of the component 200. In the illustrated embodiment, the axes of the identifying features 201 are oblique to the planes 206, 207 but, in other examples, the axes of the features 201 may be perpendicular or parallel to the axes 206, 207.

Figure 3:
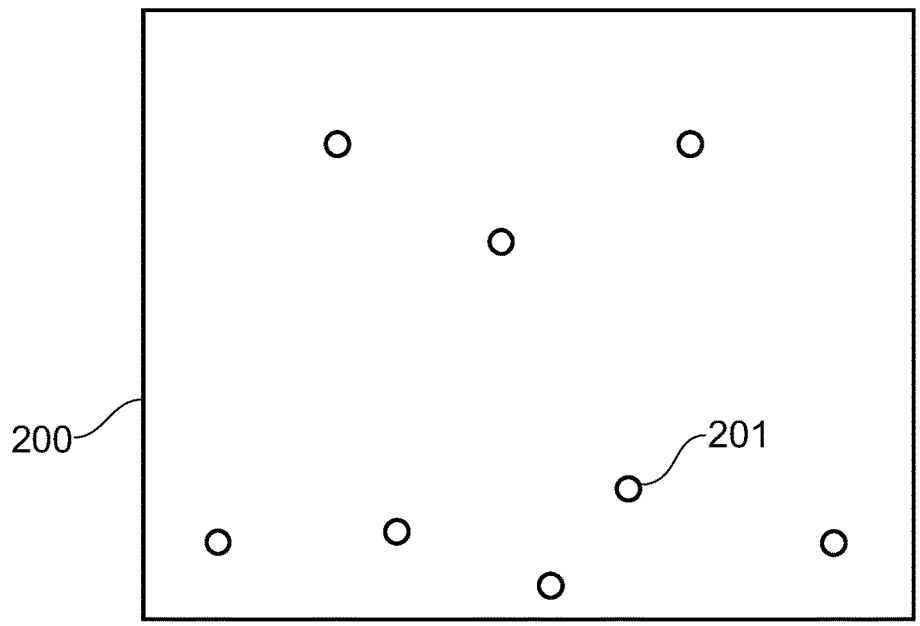
FIG. 3 shows a cross-sectional view of the identifier of FIG. 2.

The intersection of the identifying features 201 with the planes 206, 207, or any notional parallel plane therebetween forms an identical two-dimensional pattern, which can be read in a manner similar to a two-dimensional bar code. FIG. 3 shows a view from above of cross section of the component 200 taken in a plane parallel to and in between planes 206, 207. As with the identifier of the component 100, the identifier of component 200 may be unique to the component 200 to enable identification of the component, or may be common to a group of components to authenticate that the component 200 is one of the group of components. The identifying features 201 may be voids or volumes of material distinguishable from the material of the rest of the component 200 as discussed in relation to the identifying features 101, 102 above.

The elongate identifying features 201 which form the identifier may in some examples be prismatic such that a cross section taken parallel to the planes 206, 207 at any location therebetween results in an identical pattern being formed by the identifying features 201. In these examples, the pattern formed by the identifying features 201 as shown in FIG. 3 would be identical regardless of the location at which the cross section was taken between the planes 206, 207.

As the identifier of component 200 is only formed in a predetermined slice 208 of the component 200, the identifier may only be detectable if one knows to look in this particular area of the component 200. In some examples, the identifying features 201 may not be detectable by non-destructive testing as discussed above. In these examples, it may only be possible to identify the identifying features 201 by physically cutting the component 200 open.

As the identifying features 201 are only formed in a thin slice 208 of the component, they may only be identified if the cut is made within the slice 208 and substantially parallel to the two planes 206, 207. If the cut is made elsewhere, the cut may not intersect some or all of the identifying features 201 and the identifier as a whole may not be locatable.

Consequently, an identifier of the type shown in component 200 is extremely difficult for a third party to detect if they are not aware of the location and orientation of the identifier. Consequently, it may be very difficult or impossible for a counterfeit manufacturer to find and replicate the identifier of component 200. Therefore, if the details of the identifier of component 200 are kept securely by its manufacturer, it may be possible to conclusively identify or authenticate the component 200 at a later date.

Figure 4:
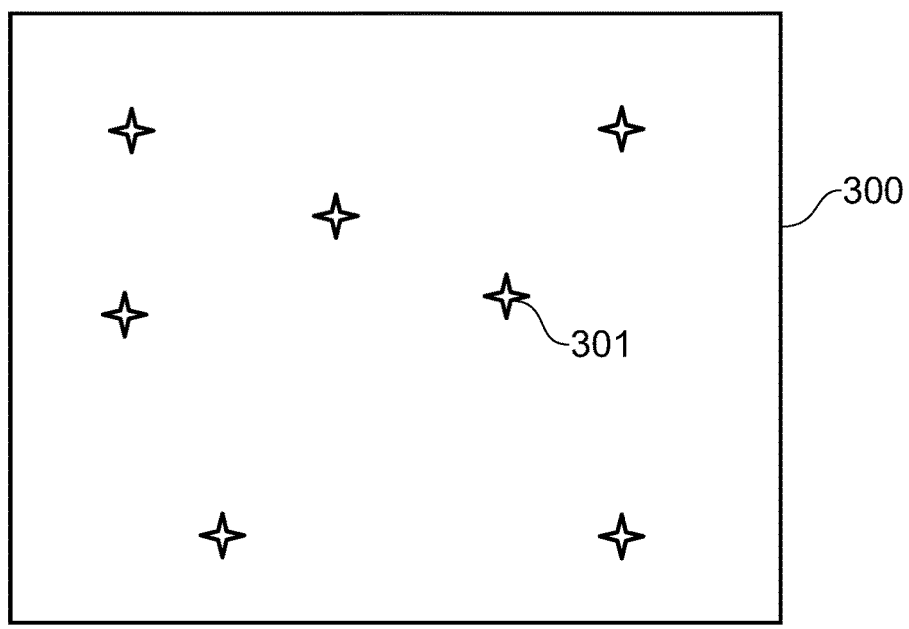
FIG. 4 shows a cross sectional view of a third embodiment of an identifier according to the present invention.

FIG. 4 shows a cross-section through an alternative component 300 of a similar construction to component 200 of FIGS. 2 and 3. Like features to components 100 and 200 are denoted by reference numerals spaces apart by 200 and 100 respectively.

In this component 300, the elongate identifying features 301 are defined between two notional parallel planes 306, 307 in a slice 308 and the cross-section of FIG. 4 is taken parallel to and in-between these planes 306, 307.

In this example, the identifying features 301 are elongate voids 301 within the component 300 which have an intricate cross-sectional shape. The cross-sectional shape of the voids 301 is designed such that if a cut is made through the component in a plane which is non-parallel to the notional planes 306, 307, then the cross-sectional shape of the voids 301 will be destroyed or otherwise rendered not visible. For example, the voids 301 may have an extremely small cross-sectional area and thin shape such that the swarf from the cutting operation would 'plug' the voids 301 and so the voids 301 would not be visible or detectable at the cut location. The same effect may also be achieved with solid identifying features having intricate or small cross-sectional shapes, which may be destroyed due to the cut kerf or not be visible or detectable if an incorrect cut is made.

Accordingly, locating the identifier of component 300 is made even more difficult for third parties, as not only must a cut be made within the slice 308, the cut must also be exactly parallel to the planes 306, 307 or the identifying features 301 will not be detectable.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a component, the method comprising:
    forming an identifier internally within the component in a predetermined location relative to a datum point, wherein the identifier can be used to subsequently identify or authenticate the component, and
    cutting the component and the identifier along a predetermined plane.

2. A method of manufacturing a component as claimed in claim 1, wherein the identifier comprises one or more identifying features located in the component in predetermined locations relative to the datum point or located in the component such that the one or more identifying features form a predetermined pattern internally within the component.

3. A method of manufacturing a component as claimed in claim 1, wherein the identifier comprises one or more voids.

4. A method of manufacturing a component as claimed in claim 1, wherein the identifier comprises one or more volumes of material.

5. A method of manufacturing a component as claimed in claim 4, wherein the component comprises a first material, and wherein the volumes of material comprise a second material different to the first material.

6. A method of manufacturing a component as claimed in claim 5, wherein the second material has different electromagnetic properties to the first material.

7. A method of manufacturing a component as claimed in claim 1, wherein the identifier is not detectable by visual inspection of the component.

8. A method of manufacturing a component as claimed in claim 1, wherein the identifier comprises one or more elongate features which extend internally within the component.

9. A method of manufacturing a component as claimed in claim 8, wherein the identifier comprises two or more elongate features and wherein the elongate features extend along parallel axes with respect to each other.

10. A method of manufacturing a component as claimed in claim 1, wherein the identifier is formed so that it intersects the predetermined plane passing through the component, the predetermined plane is located in a notional slice defined between a first notional plane and a second notional plane parallel with the first notional plane, and the predetermined plane is parallel with the first notational plane and the second notional plane.

11. A method of manufacturing a component as claimed in claim 10, wherein the identifier is formed so that cutting the component and the identifier in the notional slice along a plane that is non-parallel to the predetermined plane destroys the identifier such that the identifier is at least one of not visible and not detectable.

12. A method of manufacturing a component as claimed in claim 1, wherein manufacturing the component comprises additive manufacturing.

13. A method of manufacturing a component as claimed in claim 1, wherein the identifier can be used to verify a characteristic, origin, or manufacturer of the component.

14. A method of manufacturing a component as claimed in claim 1, comprising generating a unique identifier which can be used to distinguish the component from one or more substantially identically shaped components, and wherein the identifier formed in the component is the unique identifier.

15. A method of manufacturing a component as claimed in claim 1, comprising generating a group identifier common to a group of components which comprises the manufactured component, and wherein the identifier formed in the component is the group identifier.

16. A method comprising manufacturing a plurality of components according to the method of claim 15, wherein the plurality of components form the group of components, and the identifier formed in of each one of the group of components is the group identifier.

17. A method as claimed in claim 1, further comprising manufacturing a second component, wherein a second identifier formed internally within the second component is different to the first identifier within the first component such that the identifiers of the first and second components can be used to distinguish between the first and second components.

18. A method as claimed in claim 1, further comprising manufacturing a second component, wherein a second identifier formed internally within the second component is identical to the first identifier within the first component, such that the first and second identifiers can be used to verify that the first and second components share a common characteristic.

19. A component manufactured according to a method comprising:

forming an identifier internally within the component in a predetermined location so that the identifier intersect a predetermined plane passing through the component, the predetermined plane being located in a notional slice defined between a first notional plane and a second notional plane parallel with the first notional plane, and the predetermined plane being parallel with the first notational plane and the second notional plane, wherein the identifier can be used to subsequently identify or authenticate the component, and wherein the identifier is formed so that cutting the component and the identifier in the notional slice along a plane that is non-parallel to the predetermined plane destroys the identifier such that the identifier is unidentifiable.

20. A group of components comprising a plurality of components as claimed in claim 19, wherein the identifier of each one of the group of components is different, or wherein the identifier of each one of the group of components is identical.

* * * * *